(12) United States Patent
Brewka

(10) Patent No.: US 7,814,599 B2
(45) Date of Patent: Oct. 19, 2010

(54) TRAVEL SUPPORT MECHANISM FOR MOVABLE CONVEYOR BRIDGE

(75) Inventor: Christof Brewka, Greenwood Village, CO (US)

(73) Assignee: ThyssenKrupp Fördertechnik GmbH, Essen (DE)

( * ) Notice: Subject to any disclaimer, the term of this patent is extended or adjusted under 35 U.S.C. 154(b) by 451 days.

(21) Appl. No.: 11/871,550

(22) Filed: Oct. 12, 2007

(65) Prior Publication Data

US 2009/0095595 A1    Apr. 16, 2009

(51) Int. Cl.
*E01D 15/10* (2006.01)

(52) U.S. Cl. .............................. 14/2.4; 14/2.5; 198/301

(58) Field of Classification Search ............. 14/2.4–2.5; 198/300, 312, 313, 315, 301
See application file for complete search history.

(56) References Cited

U.S. PATENT DOCUMENTS

| | | | |
|---|---|---|---|
| 5,404,988 A | 4/1995 | Koenigs | |
| 6,155,400 A * | 12/2000 | Daigh et al. | 198/301 |
| 6,918,152 B2 * | 7/2005 | Fuessinger et al. | 14/77.1 |
| 7,455,173 B1 * | 11/2008 | Fridman et al. | 198/812 |
| 7,555,799 B2 * | 7/2009 | Petermann et al. | 14/2.5 |
| 2005/0123385 A1 * | 6/2005 | Kirsch | 414/573 |
| 2007/0039802 A1 * | 2/2007 | Kahrger et al. | 198/303 |

FOREIGN PATENT DOCUMENTS

DE    42 05 557 A1    8/1993

\* cited by examiner

*Primary Examiner*—Raymond W Addie
(74) *Attorney, Agent, or Firm*—McGlew and Tuttle, P.C.

(57) ABSTRACT

A travel support device for a conveyor bridge 4 having a swivel joint 12, a two-axis tilting joint 10 and a roller table 8. A portion of the tilting joint 10 is mounted to the swivel joint 12 and another portion of the tilting joint 10 is mounted to the roller table 8 such that the tilting joint 10 rotates about a defined longitudinal axis 30 and an axis 32 transverse of the longitudinal axis 30.

20 Claims, 13 Drawing Sheets

TRAVEL SUPPORT MECHANISM FOR MOVABLE CONVEYOR BRIDGE

FIELD OF THE INVENTION

The present invention generally relates to movable conveyors and more particularly pertains to a travel support device for a movable conveyor bridge.

BACKGROUND OF THE INVENTION

Movable conveyor bridges are used for conveying material, for example from the site of a mining operation. A problem exists in moving a conveyor bridge over uneven ground without introducing the forces that result from the unevenness of the ground to the conveyor bridge. This is especially a problem in oil sand or tar sand mines and in many different applications. This is particularly difficult on side slopes or uphill sections since the conveyor bridge must always be directed horizontally (in the lateral direction) to make it possible to convey material.

A conventional technique to control the level of the conveyor bridge is to provide a tilting joint in the longitudinal direction having a tilt axis at a right angle to the conveyor bridge. The tilting joint is provided above the swivel joint. Another tilting joint in the transverse direction is provided below the swivel joint. This other tilting joint has a tilt axis along the conveyor bridge. This arrangement disadvantageously leads to the drawback that the conveyor bridge can only be kept horizontal when the chassis is at right angles (90°) to the conveyor bridge. As such, keeping the conveyor bridge horizontal at other steering positions is very limited. This makes it difficult to maneuver the conveyor bridge along uneven or sloped ground. Further, such a conventional technique can only be used where even and well prepared ground conditions are present, such as in leach pad systems. There are other well prepared surface applications other than leach pad systems. Leach pad systems are ore extraction systems used in the copper and gold industry in which finely crushed ore is loaded on a pile over a large area and irrigated with an acid solution. Over time the ore is leached out of the rock. The leach solution is then collected and the mineral in the leach solution is extracted. Leach pads have well prepared ground conditions which are flat and horizontal. As such, the conventional techniques used for leach pad systems are not suited for applications where movable conveyor bridges have to travel about uneven ground conditions, such as sand oil or tar sand mines in which the ground is uneven and sloped since a cylinder arrangement having a greater path of adjustment is necessary to maintain the conveyor bridge in a stable position. Accordingly, there exists a need to solve the problem of maintaining a conveyor bridge in a horizontal position when the conveyor bridge is moved along uneven ground or located on a sloped section of ground.

U.S. Pat. No. 5,404,988 (corresponding to DE 42 05 557) discloses a connecting belt bridge provided with the feed end side and the discharge side end each supported on respective traveling means. The discharge side traveling means includes a traveling unit which is not railbound. The connecting belt bridge is pivotally supported on the discharge side traveling means by way of a ball joint connection and on the feed side traveling means by a longitudinally displaceable single point support including a support beam which can be horizontally aligned and has at its feed side end a feed jib hinged on by way of a horizontal transverse axis. However, the connection to the traveling means with this type of joint does not fully address the problem regarding supporting a polynominal conveyor bridge that is supported by several self-propelled chassis and moving across ground that is uneven and sloped.

SUMMARY OF THE INVENTION

The object of the present invention is therefore to provide a travel support device that maintains the position of the conveyor bridge when the conveyor bridge is built of polynominal construction type and is moved along uneven ground or is located on a sloped section of ground.

According to the invention, a travel support device is provided for a movable conveyor bridge. The device comprises a swivel joint, a two-axis tilting joint and a roller table. A portion of the tilting joint is mounted to the swivel joint and another portion of the tilting joint is mounted to the roller table such that the tilting joint rotates about a defined longitudinal axis and an axis transverse of the longitudinal axis.

The travel support device further comprises another roller table for connection to a conveyor bridge. The roller table is connected to the another roller table.

The roller table and the another roller table have rolling means for moving the roller table in a longitudinal direction and for moving the other roller table in a direction transverse of the longitudinal direction.

The roller table is movable relative to the other roller table.

The travel support device further comprises a chassis having a driving means attached thereto for moving the chassis. The swivel joint is rotatably connected to the chassis.

The two-axis tilting joint responds to movements of the driving means.

The travel support device further comprises cylinders. The cylinders are connected to the roller table and the swivel joint. The cylinders respond to the movement of the tilting joint. The cylinders maintain the position of the roller table based on the tilting movement of the tilting joint such that the roller table remains level when the chassis is moved via the driving means. The cylinders only act for movements lateral to the direction of the bridge and do not restrict any movements in the longitudinal direction of the bridge.

According to the invention, the travel support device may comprise a chassis having a mount. A travel drive is connected to the chassis for moving the chassis. A swivel joint is attached to the mount such that the swivel joint rotates with respect to the chassis. The swivel joint has a connection mount. A two-axis tilting joint having a first portion and a second portion and a first roller table are provided. The first portion of the tilting joint is mounted to the first roller table and the second portion of the tilting joint is connected to the connection mount of the swivel joint such that the tilting joint moves about a defined longitudinal axis and a defined axis transverse of the longitudinal axis. The tilting joint moves in response to the position and the movement of the travel drive. A second roller table is mounted to the first roller table.

The first roller table and the second roller table have roller means for moving the first roller table and the second roller table relative to one another.

The first roller table moves in a direction of the longitudinal axis via the roller means. The second roller table moves in a direction transverse of the longitudinal axis via the roller means.

The travel support device further comprises an actuating means connected to the swivel joint and the second roller table for maintaining a position of the first roller table based on the tilting motion of the tilting joint such that the first roller table is maintained in a balanced position when the driving means is on uneven ground.

The travel support device further comprises a conveyor bridge. The second roller table is connected to the conveyor bridge. The conveyor bridge is movable along a direction of the longitudinal axis via the second roller table. The conveyor bridge is movable along a direction of the axis transverse of the longitudinal axis via the first roller table.

A position of the first roller table and a position of the second roller table is used to control the actuating means.

According to the invention, the travel support device may comprise a chassis having a mount. An endless track drive is connected to the chassis for moving the chassis. A swivel joint may be rotatably mounted to the mount. The swivel joint has a connection mount. A two-axis tilting joint and a first roller table are provided. The two-axis tilting joint has a first portion and a second portion. The first portion of the two-axis tilting joint is mounted to the first roller table and the second portion of the two-axis tilting joint is connected to the connection mount of the swivel joint such that the two-axis tilting joint moves about a defined longitudinal axis and a defined axis transverse to the longitudinal axis. The two-axis tilting joint moves in response to the position and the movement of the endless track drive. A second roller table is mounted to the first roller table. An actuating means is provided for controlling the position of the first roller table based on the position of the first roller table with respect to the swivel joint such that the first roller table and the second roller table maintain a level position when the chassis is moved via the endless track drive.

The first roller table and the second roller table may have a stopping element. The stopping element prevents movement of the roller means.

The conveyor bridge is maintained at a level position via the actuating means, the first roller table and the second roller table.

The actuating means responds to tilting movements of the two-axis tilting joint such that the actuating means counteracts the forces applied to the two-axis tilting joint.

The conveyor bridge may be displaced in the transverse and longitudinal directions or it can move in a pivoting motion.

The chassis may be extensively uncoupled kinematically from the conveyor bridge.

The travel support device advantageously absorbs the forces created by the unevenness of the ground without introducing them to the conveyor bridge.

The mobile conveyor bridge is advantageously designed for use on side slopes and on uphill sections. The conveyor bridge may be directed horizontally to convey material.

Each chassis has an independent drive. The travel support device is advantageously designed such that control and steering motions do not lead to constraining forces in the conveyor bridge by allowing the bridge to move freely in the longitudinal and transverse directions.

The horizontal position of the bridge is maintained, regardless of ground, by means of an electronic water level.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiment of the invention is illustrated.

DESCRIPTION OF THE PREFERRED EMBODIMENT

Figure 1:
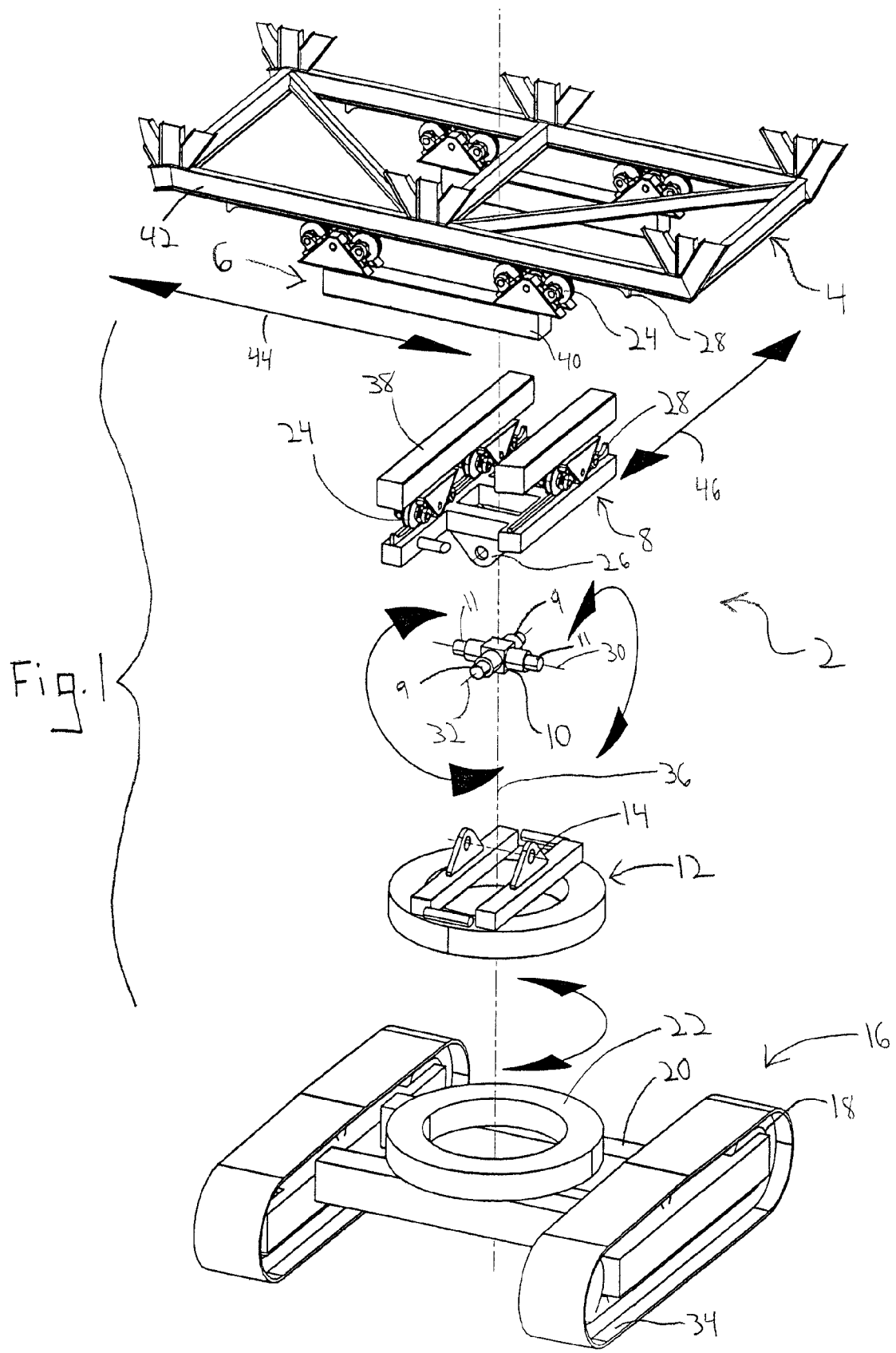
FIG. 1 is an exploded perspective view of the travel support device.

Referring to the drawings in particular, FIG. 1 shows an exploded perspective view of the travel support device 2 for supporting a conveyor bridge 4. The conveyor bridge 4 is connected to a roller table 6. Roller table 6 is connected to another roller table 8. The roller table 8 has a connection element 26. A two-axis tilting joint 10 is provided. A portion 9 of the joint 10 is connected to the roller table 8 via connection element 26. The joint 10 rotates about a defined longitudinal axis 30. The joint 10 also rotates about a defined axis 32 that transverses the longitudinal axis 30. A swivel joint 12 has a connection mount 14. Another portion 11 of the joint 10 is connected to the swivel joint 12 via connection mount 14. A caterpillar-type (endless track) moving device 16 is provided. The moving device 16 has a chassis 20 and a travel drive 18. The travel drive 18 is connected to an endless track 34 for moving the chassis 20. The chassis 20 is connected to a mount 22. The swivel joint 12 is connected to the chassis 20 via mount 22 such that the swivel joint rotates about axis 36.

The roller table 6 and the other roller table 8 have rollers 24 that allow the roller tables to move relative to each other. The rollers 24 of roller table 8 are placed between rails 38. The rollers 24 of roller table 6 are placed between rail 40 and a rail 42 of the conveyor bridge 4. Each roller table is provided with a roller stopper element 28 to allow the rollers to roll only a certain distance, which is preferably 1 meter or less. The roller table 6 moves in a direction along the longitudinal axis 30 as indicated by the arrow 44. The roller table 8 moves in a direction along the axis 32 as indicated by the arrow 46. The connection of the roller tables 6, 8 advantageously allow the conveyor bridge 4 to move in a direction along the longitudinal axis 30 as indicated by the arrow 44 and along the axis 32 as indicated by arrow 46.

Figure 2:
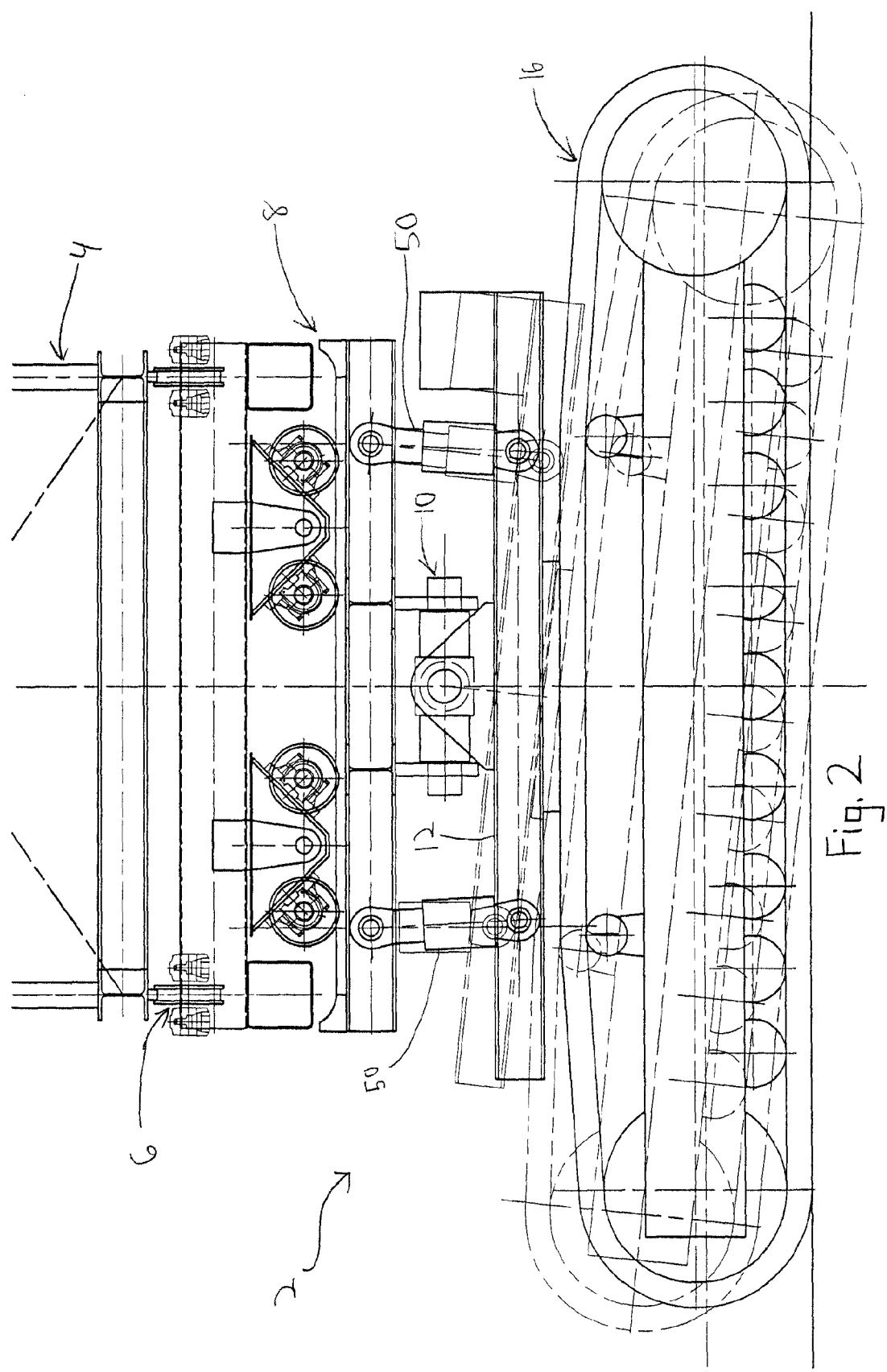
FIG. 2 is a side view of the travel support device.

FIG. 2 shows a side view of the support travel device 2. Actuators or cylinders 50 are connected to the swivel joint 12 and the roller table 8. The dash lines indicate the position of the caterpillar-type moving device 16 and its effect on the position of the swivel joint and actuators 50 when the caterpillar-type moving device 16 moves along uneven ground or is positioned at a sloped section of ground. The actuators 50 respond to the movements of the caterpillar-type moving device 16 or the location of the caterpillar-type moving device 16. The actuators 50 advantageously maintain the level of the conveyor bridge 4 by controlling the position of roller table 8. This allows the conveyor bridge 4 to maintain a stable position when the caterpillar-type moving device 16 is moved along uneven ground or is located at a sloped section of ground. The actuators 50 advantageously respond to the tilting motion of the joint 10 and apply a force to counteract the forces applied via the uneven ground.

Figure 3:
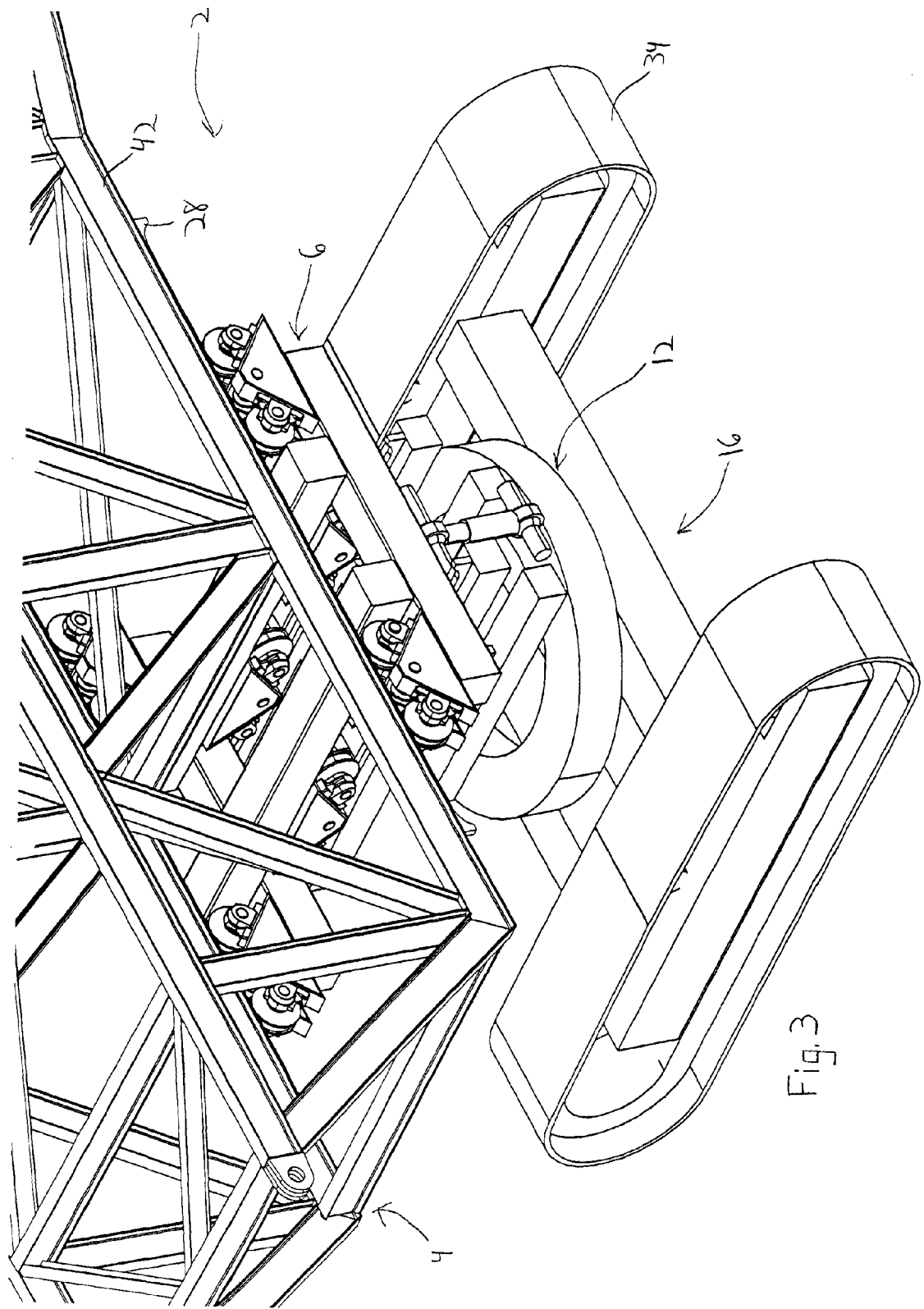
FIG. 3 is a perspective view of the travel support device.

FIG. 3 shows a perspective view of the support travel device 2. The conveyor bridge 4 is provided with a series of rails 42 that are connected together to provide a frame structure.

Figure 4:
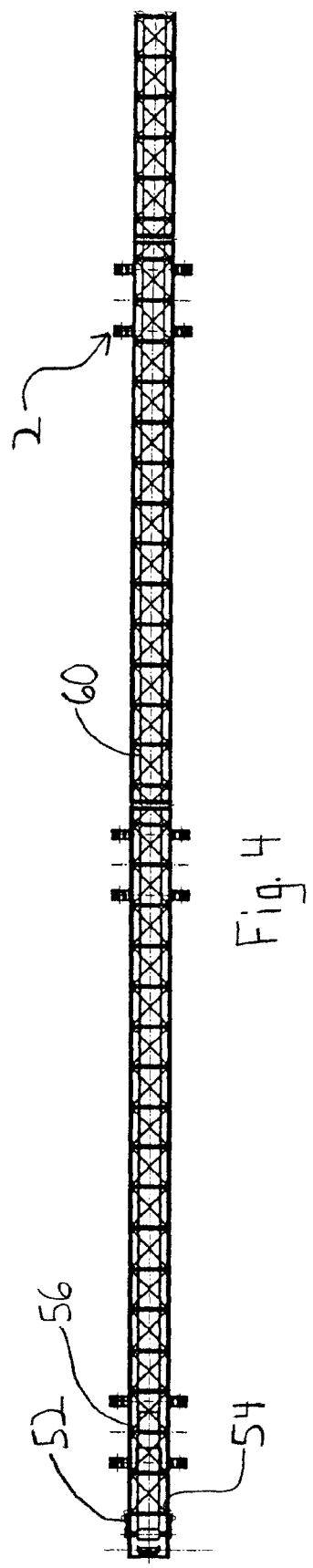
FIG. 4 is a top view of the travel support device.

FIG. 4 shows a top view of a series of travel support devices 2 connected to one another. Motors 52 and transformers 56 are provided at one end of the series of travel support devices 2 for moving the conveyor belt 60. Two motors can advantageously be used to move the conveyor belt 60. A hydraulic or a gravity take-up cylinder 54 is located at one end of the connected travel support devices 2.

Figure 5:
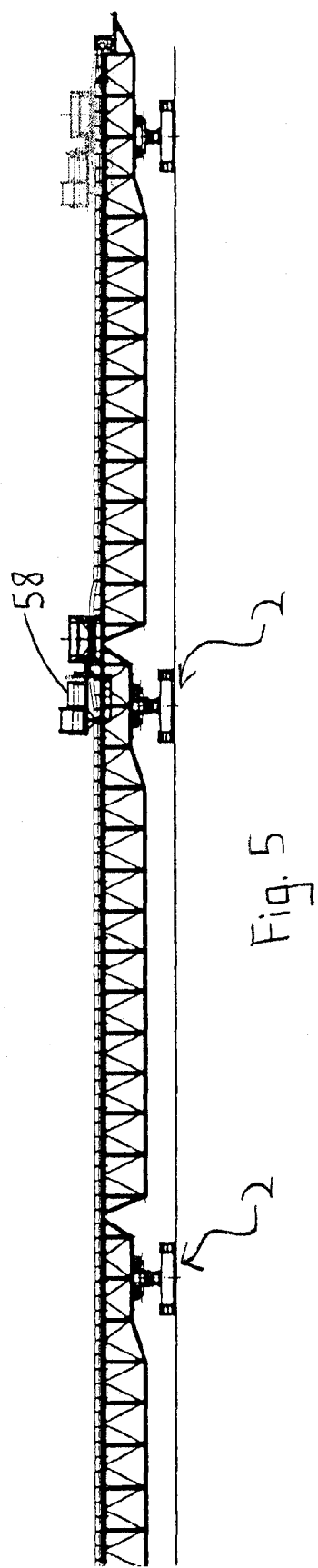
FIG. 5 is a front view of the travel support device.

FIG. 5 shows a front view of a series of travel support devices 2 connected to one another. Control stations 58 are provided along the connected series of travel support devices 2.

Figure 6:
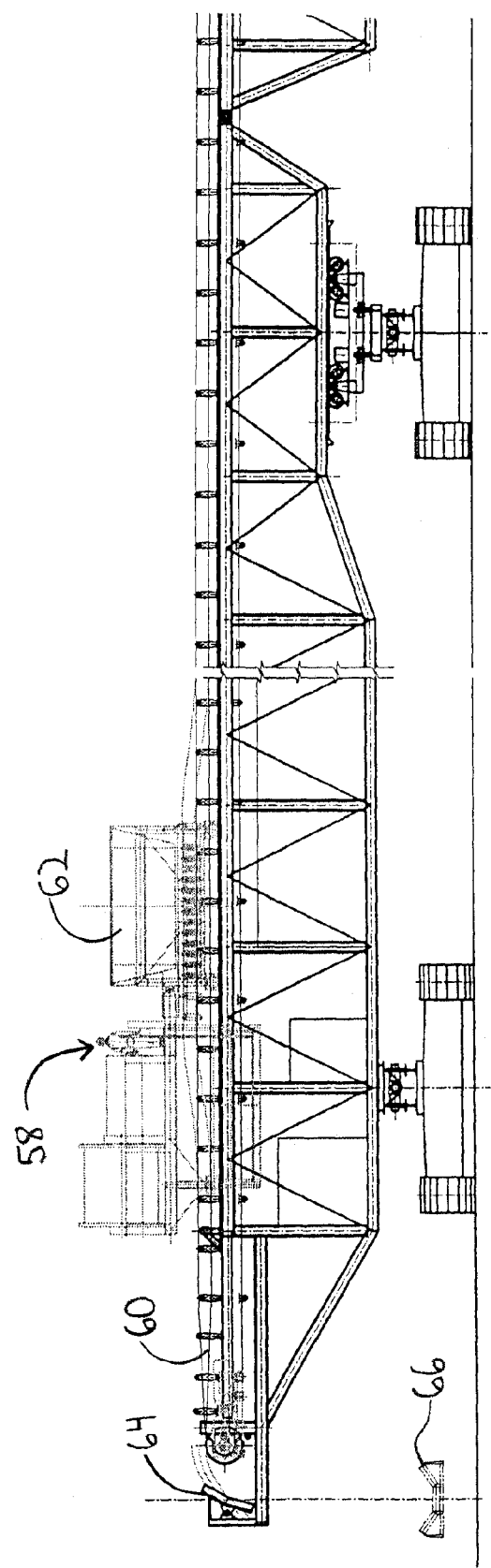
FIG. 6 is another front view of the travel support device.

FIG. 6 shows another front view of the series of travel support devices 2 connected to one another. The control station 58 is provided with a hopper 62 for feeding material into the conveyor belt 60. The conveyor belt 60 transfers the deposited material to a shiftable conveyor 66. Material is deflected from the conveyor belt 60 to a material guide element 64. This is only for example. The hopper could be replaced by a tripper for stacking systems. The material guide element 64 is not relevant for the invention and could be eliminated in other cases.

Figure 7:
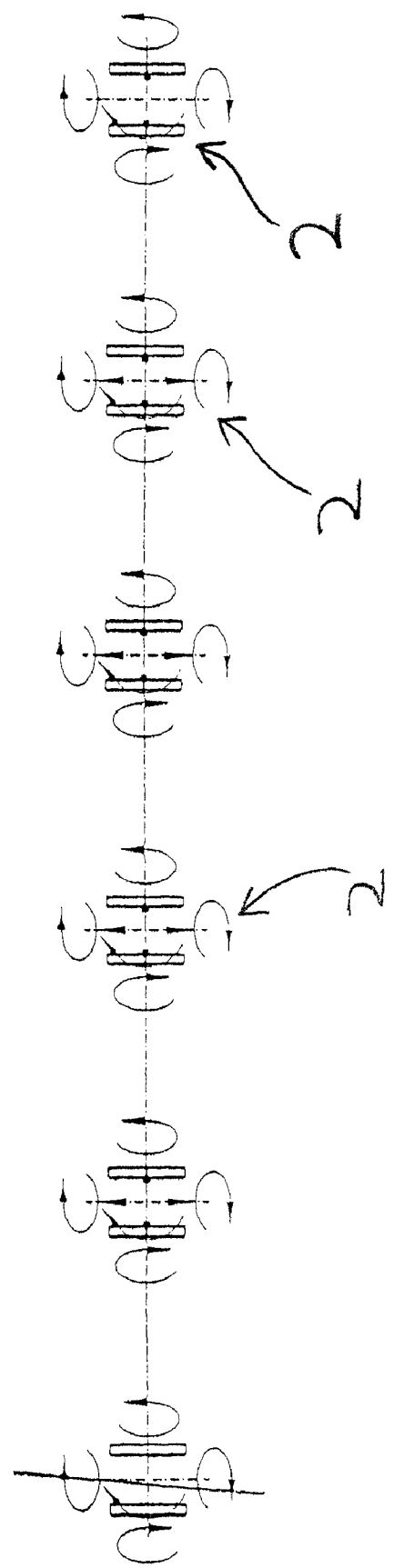
FIG. 7 is a motion diagram of the travel support device.

FIG. 7 shows a motion diagram of the movement of one travel support device 2 relative to another travel support device 2.

Figure 8:
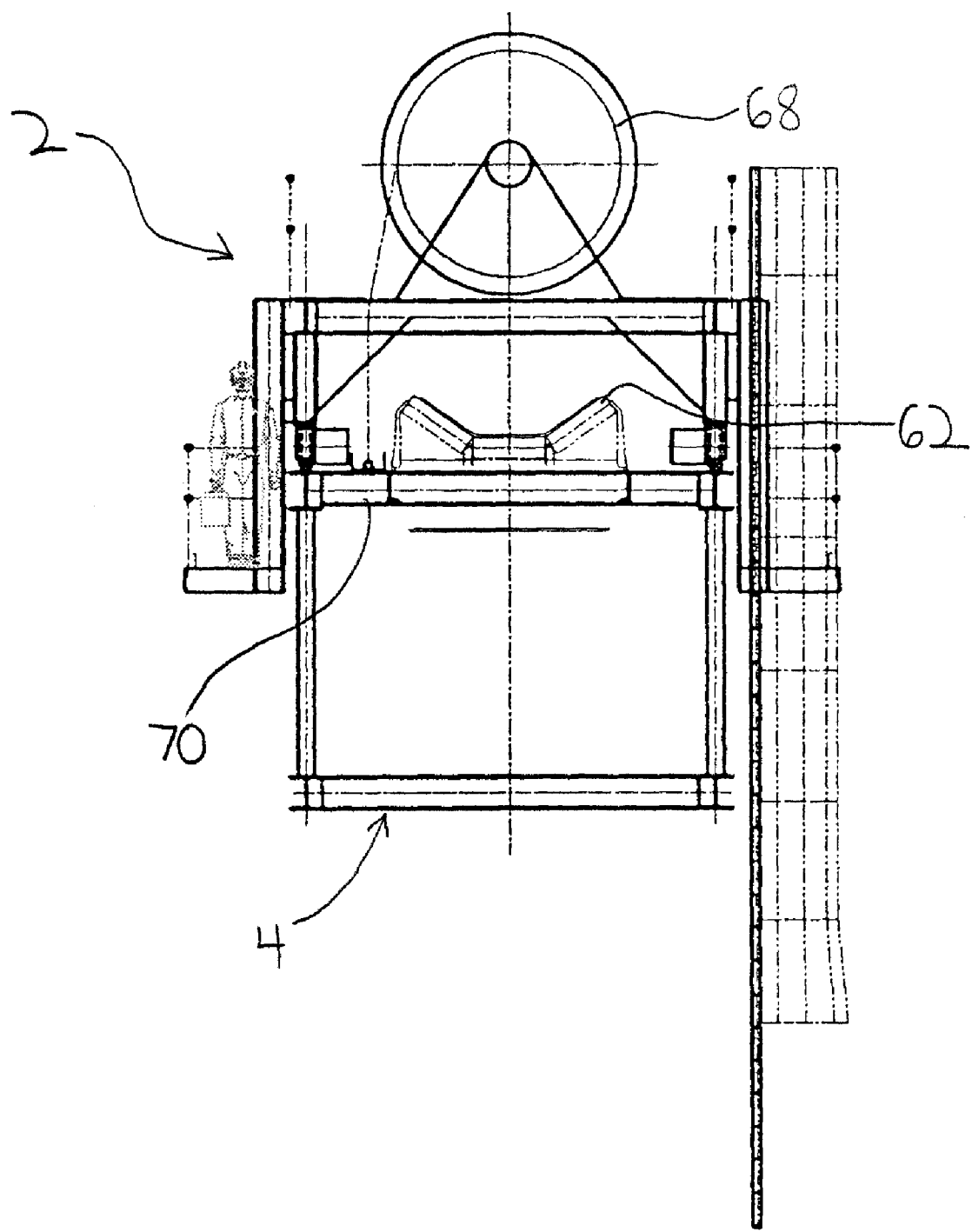
FIG. 8 is another side view of the travel support device.

FIG. 8 shows another side view of the travel support device 2. A cable drum 68 is connected to the conveyor bridge 4. A cable tray 70 is also connected to the conveyor bridge 4.

Figure 9:
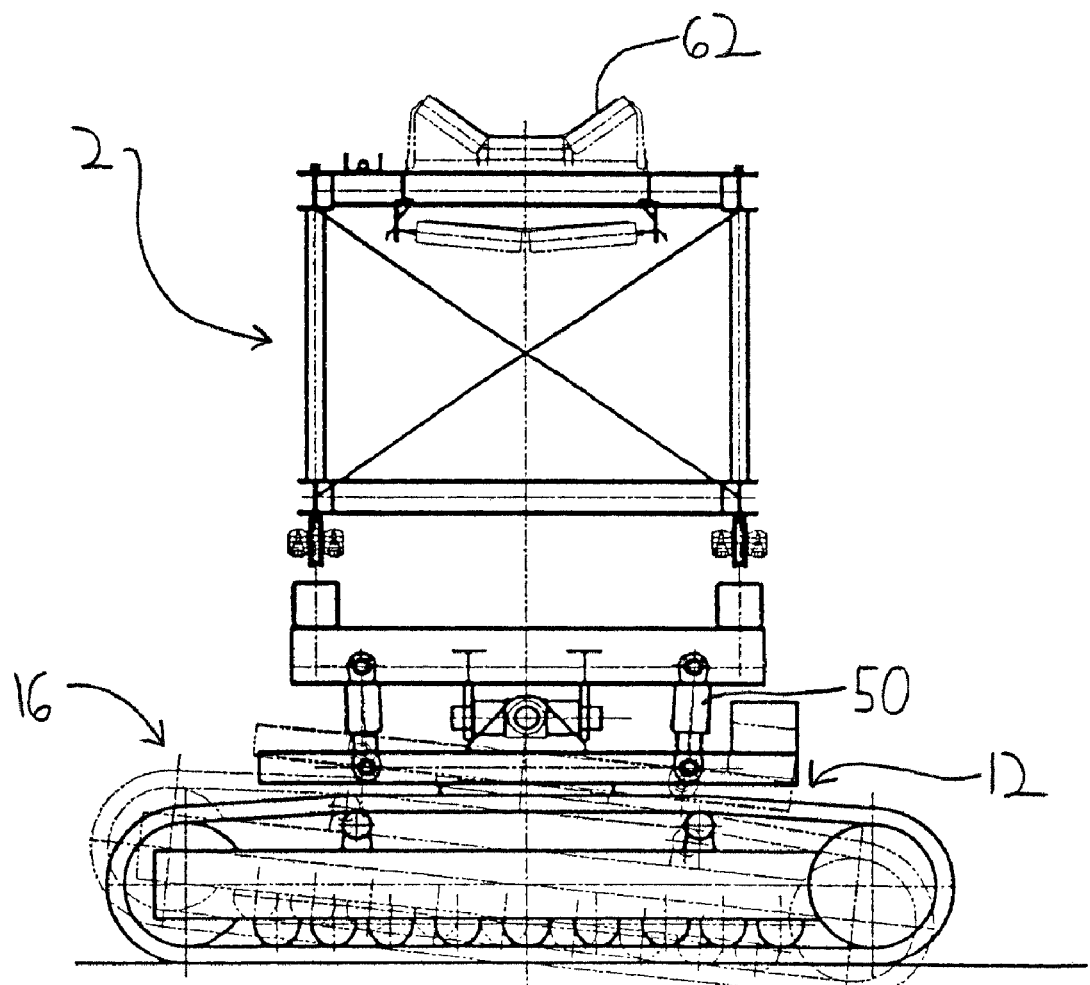
FIG. 9 is another side view of the travel support device.

FIG. 9 shows another side view of the travel support device 2. Similar to FIG. 2, the dash lines indicate the position of the caterpillar-type moving device 16 and its effect on the position of the swivel joint and actuators 50 when the caterpillar-type moving device 16 moves along uneven ground or is positioned at a sloped section of ground.

Figure 10:
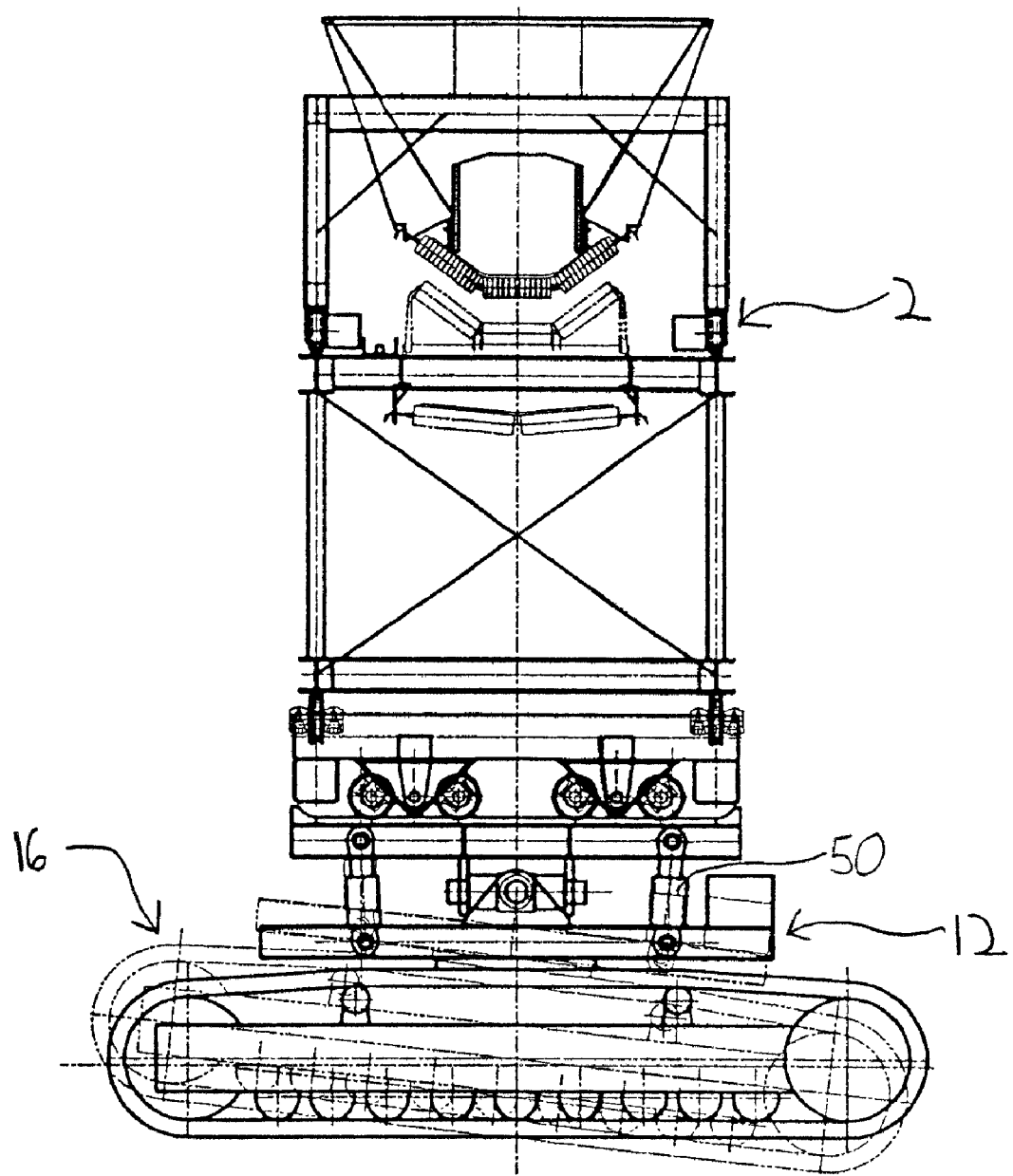
FIG. 10 is another side view of the travel support device.

FIG. 10 shows another side view of the travel support device 2. Similar to FIG. 9, the dash lines indicate the position of the caterpillar-type moving device 16 and its effect on the position of the swivel joint and actuators 50 when the caterpillar-type moving device 16 moves along uneven ground or is positioned at a sloped section of ground.

Figure 11:
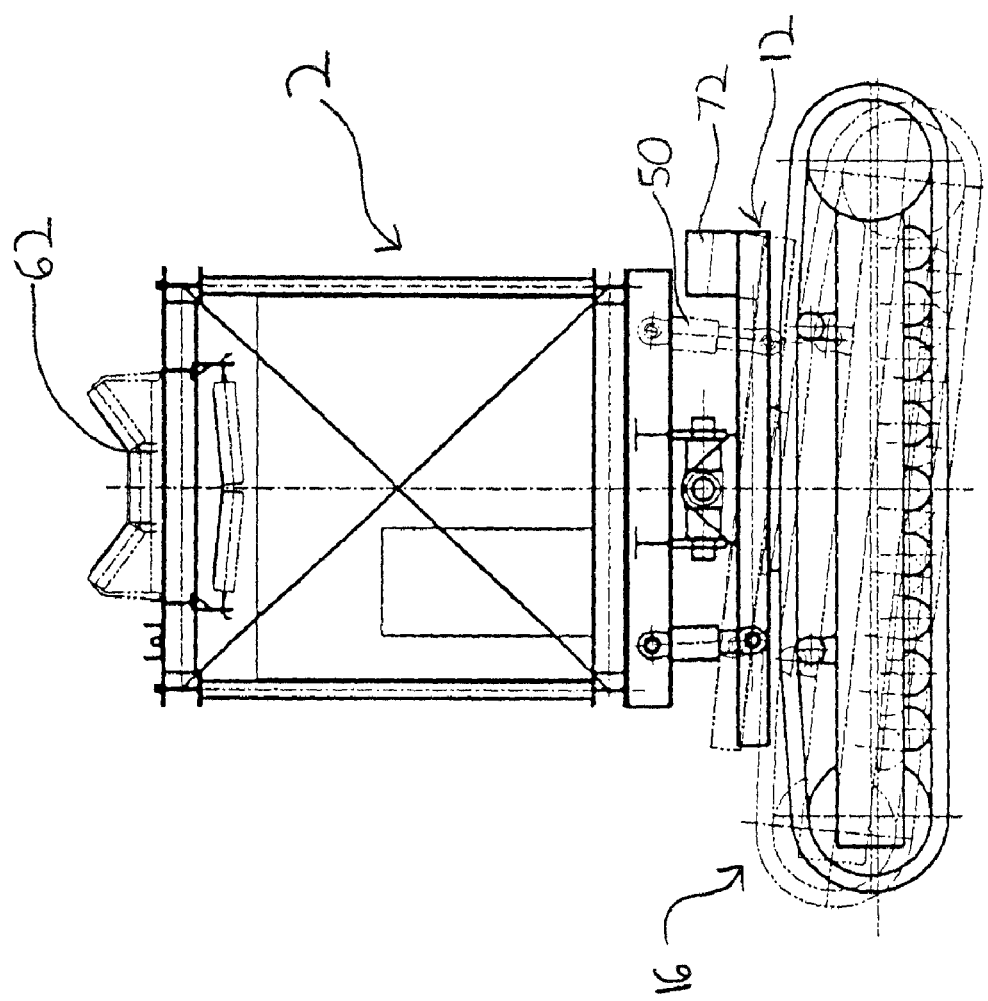
FIG. 11 is another side view of the travel support device.

FIG. 11 shows another side view of the travel support device 2. Similar to FIG. 10, the hidden lines indicate the position of the caterpillar-type moving device 16 and its effect on the position of the swivel joint and actuators 50 when the caterpillar-type moving device 16 moves along uneven ground or is positioned at a sloped section of ground. A power source 72 is located on the swivel joint 12 for providing power to the actuators 50.

Figure 12:
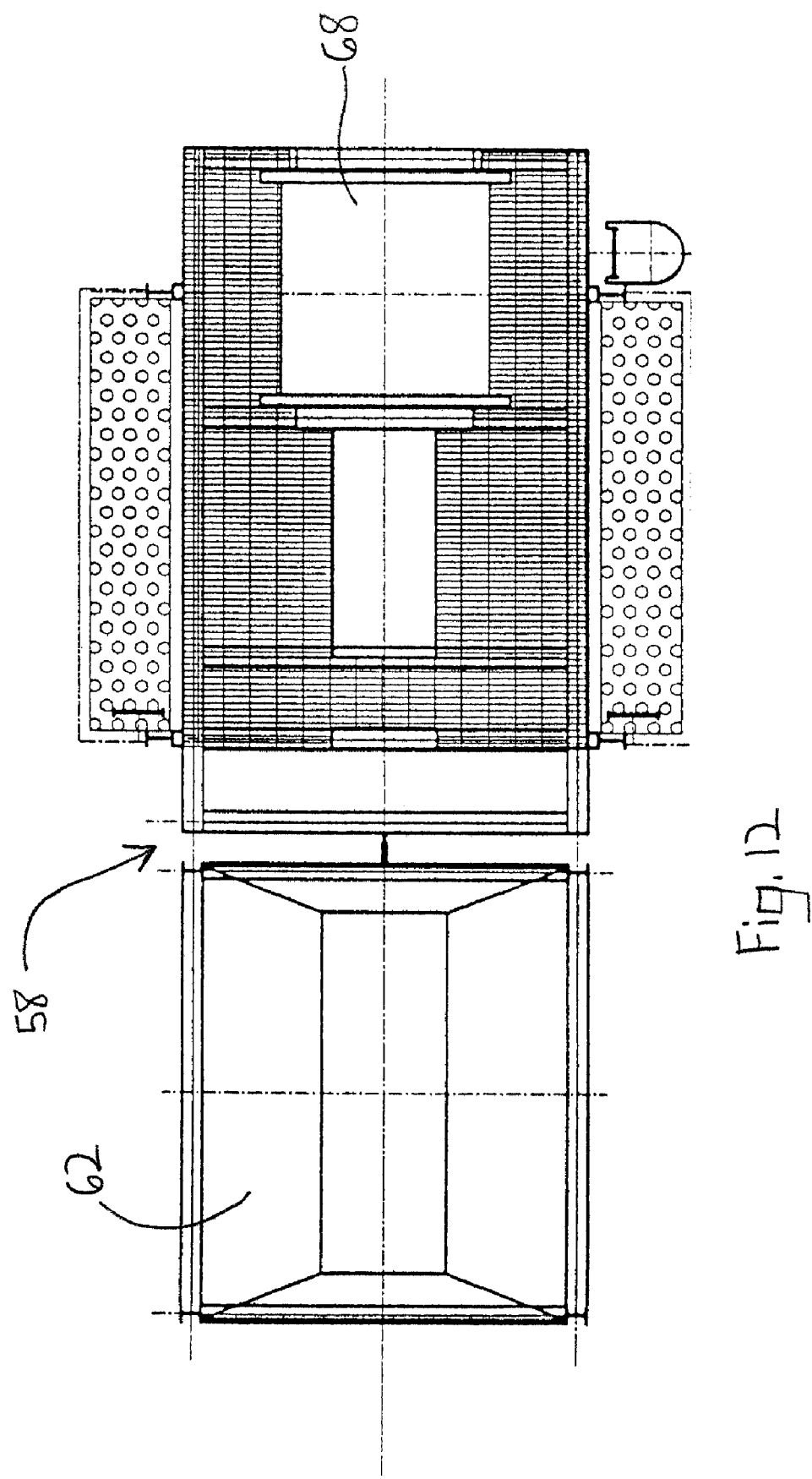
FIG. 12 is a top view of a hopper and a control station located on the travel support device.
Figure 13:
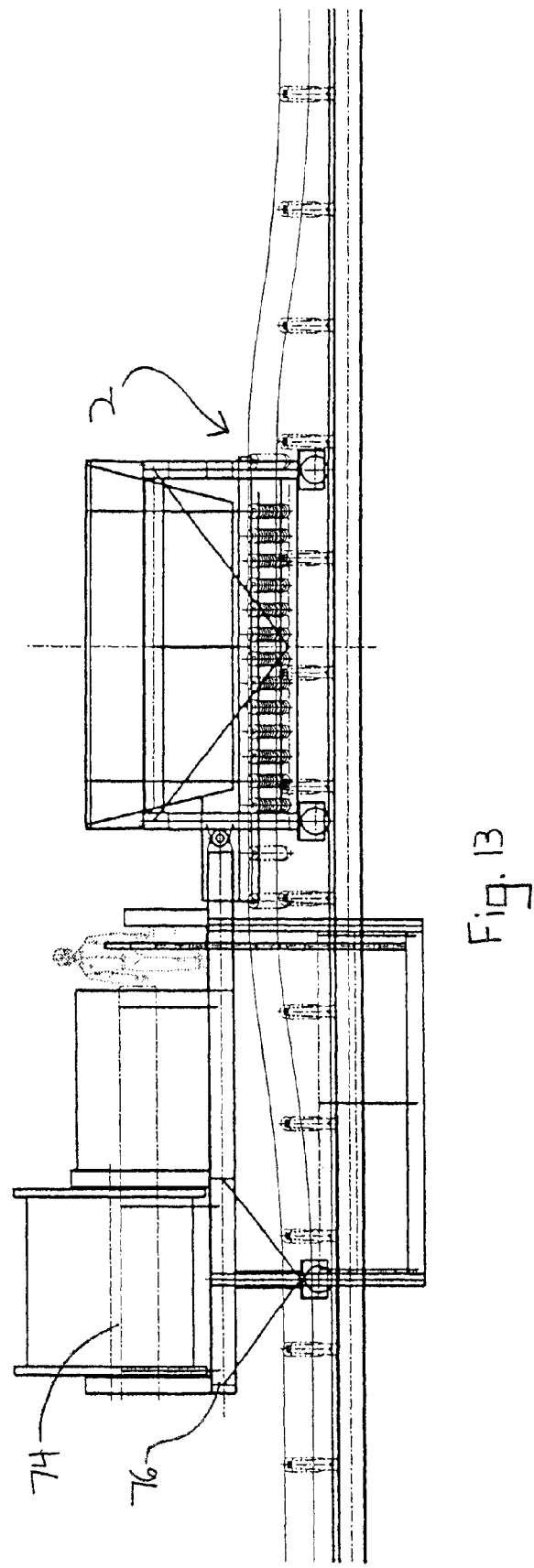
FIG. 13 is a front view of the hopper and control station of the travel support device.

FIGS. 12 and 13 show a hopper, however the same machine could be used with a tripper arrangement (opposite flow direction) in case of a stacking application. Both variations are part of the invention. FIG. 12 shows a top view of the hopper 62 located adjacent the control station 58 located on the travel support device 2. The cable drum 68 is located adjacent the control station.

FIG. 13 shows a front view of the hopper 62 located adjacent the control station 58 on the travel support device 2. Hand rails 74 are provided on the control station 58 for safety purposes. A skirt board 76 is positioned adjacent the hopper 62.

While a specific embodiment of the invention has been shown and described in detail to illustrate the application of the principles of the invention, it will be understood that the invention may be embodied otherwise without departing from such principles.

What is claimed is:

1. A travel support device for a movable conveyor bridge, the device comprising:
   a swivel joint;
   a two-axis tilting joint;
   a roller table, wherein a portion of said tilting joint is mounted to said swivel joint and another portion of said tilting joint is mounted to said roller table such that said tilting joint rotates about a defined longitudinal axis and an axis transverse of said longitudinal axis.

2. A device in accordance with claim 1, further comprising another roller table for connection to a conveyor bridge, said roller table being connected to said another roller table.

3. A device in accordance with claim 2, wherein said roller table and said another roller table have rolling means for moving said roller table in a longitudinal direction and for moving said another roller table in a direction transverse said longitudinal direction.

4. A device in accordance with claim 2, wherein said roller table is movable relative to said another roller table.

5. A device in accordance with claim 1, further comprising:
   cylinders; and
   a chassis having a driving means attached thereto for moving said chassis, said swivel joint being rotatably connected to said chassis, wherein said two-axis tilting joint responds to movements of said driving means, said cylinders being connected to said roller table and said swivel joint, said cylinders responding to movement of said tilting joint, said cylinders maintaining position of said roller table based on tilting movement of said tilting joint such that said roller table remains level when said chassis is moved via said driving means.

6. A device in accordance with claim 1, wherein said two-axis tilting joint is arranged at a position above said swivel joint.

7. A device in accordance with claim 6, wherein said longitudinal axis is perpendicular to said transverse axis, said longitudinal axis intersecting said transverse axis.

8. A travel support device for a movable conveyor bridge, the device comprising:
   a chassis having a mount;
   a travel drive connected to said chassis for moving said chassis;
   a swivel joint attached to said mount such that said swivel joint rotates with respect to said chassis, said swivel joint having a connection mount;
   a two-axis tilting joint having a first portion and a second portion;
   a first roller table, said first portion of said tilting joint being mounted to said first roller table and said second portion of said tilting joint being connected to said connection mount of said swivel joint such that said tilting joint moves about a defined longitudinal axis and a defined axis transverse said longitudinal axis, said tilting joint moving in response to position and movement of said travel drive; and
   a second roller table mounted to said first roller table.

9. A device in accordance with claim 8, wherein said first roller table and said second roller table have roller means for moving said first roller table and said second roller table relative to one another.

10. A device in accordance with claim 9, wherein said first roller table moves in a direction of said longitudinal axis via said roller means, said second roller table moving in a direction transverse said longitudinal axis via said roller means.

11. A device in accordance with claim 8, further comprising an actuating means connected to said first roller table and said swivel joint for maintaining a position of said first roller table based on tilting motion of said tilting joint such that said first roller table is maintained in a balanced position when said travel drive is on uneven ground.

12. A device in accordance with claim 8, further comprising a conveyor bridge, said second roller table being connected to said conveyor bridge, said conveyor bridge being movable along a direction of said longitudinal axis via said second roller table, said conveyor bridge being movable along a direction of said axis transverse of said longitudinal axis via said first roller table.

13. The device in accordance with claim 11, wherein a position of said first roller table and a position of said second roller table is used to control said actuating means.

14. A travel support device for a movable conveyor bridge, the device comprising:
- a chassis having a mount;
- an endless track drive connected to said chassis for moving said chassis;
- a swivel joint rotatably mounted to said mount, said swivel joint having a connection mount;
- a two-axis tilting joint having a first portion and a second portion;
- a first roller table, said first portion of said two-axis tilting joint being mounted to said first roller table and said second portion of said two-axis tilting joint being connected to said connection mount of said swivel joint such that said two-axis tilting joint moves about a defined longitudinal axis and a defined axis transverse to said longitudinal axis, said two-axis tilting joint moving in response to position and movement of said endless track drive;
- a second roller table mounted to said first roller table; and
- an actuating means for controlling the position of said first roller table based on position of said first roller table with respect to said swivel joint such that said first roller table and said second roller table maintain a level position when said chassis is moved via said endless track drive, said actuating means being connected to said swivel joint and said first roller table.

15. A device in accordance with claim 14, wherein said first roller table and said second roller table have roller means for moving said first roller table and said second roller table relative to one another.

16. A device in accordance with claim 15, wherein said first roller table and said second roller table have a stopping element, said stopping element preventing movement of said roller means.

17. A device in accordance with claim 14, wherein said second roller table moves in a direction of said longitudinal axis via said roller means, said first roller table moving in a direction transverse of said longitudinal axis via said roller means.

18. A device in accordance with claim 14, further comprising a conveyor bridge, said second roller table being connected to said conveyor bridge, said conveyor bridge being movable along a direction of said longitudinal axis via said second roller table, said conveyor bridge being movable along a direction of said axis transverse of said longitudinal axis via said first roller table.

19. A device in accordance with claim 18, wherein said conveyor bridge is maintained at a level position via said actuating means, said first roller table and said second roller table.

20. A device in accordance with claim 14, wherein said actuating means responds to tilting movements of said two-axis tilting joint such that said actuating means counteracts forces applied to said two-axis tilting joint.

* * * * *